Jan. 31, 1950 P. C. ROVENTINI 2,495,775
FASTENER REMOVAL TOOL
Filed Aug. 8, 1946

INVENTOR.
PHILIP C. ROVENTINI
BY
*M. C. Hayes*
ATTORNEY

Patented Jan. 31, 1950

2,495,775

UNITED STATES PATENT OFFICE 2,495,775

FASTENER REMOVAL TOOL

Philip C. Roventini, Carson City, Nev.

Application August 8, 1946, Serial No. 689,130

2 Claims. (Cl. 164—27)

(Granted under the act of March 3, 1883, as amended April 30, 1928; 370 O. G. 757)

This invention relates to tools, and more particularly to a tool for removing a fastener embedded near the edge of a flat member, at least a portion of said member being fabricated of rubber or like material.

In the manufacture of containers such as self-sealing gasoline tanks, it is customary to provide hand holes or other openings which are normally covered by plates secured around the holes by bolts. Because of the nature of the contained material, the ring surrounding the hole is covered with an appreciable thickness of rubber or similar material. In order to provide proper securing means for the hand hole cover, it is customary to embed a metal ring in the rubber immediately surrounding the opening and to anchor in said ring a number of evenly spaced dome nuts into which bolts may be screwed for holding the hand hole cover.

In the manufacture of such a hand hole and surrounding ring, it is customary first to fabricate the metal ring and then to insert the dome nuts into suitable holes in the ring, the nuts being held therein by splines. The ring, with the dome nuts mounted therein, is then vulcanized into a suitable rubber ring which may be in turn secured to the gasoline tank to provide a hand hole opening. A cover, also rubber covered and having bolt holes opposite the dome nuts in the ring, may then be mounted over the hole, being held thereon by the bolts.

During repeated removal and re-application of the cover plate, the dome nuts may become damaged, as by mashing of the threads therein. In the past, it has been necessary to remove the entire rubber ring assembly from the tank and replace it with a new one.

It is an object of this invention to provide a tool for expeditiously removing a dome nut from such an assembly as described above.

It is another object to provide such a tool having means for first incising the rubber around the dome nut and means for then driving the dome nut from its splined anchorage in the metal ring embedded in the rubber ring.

It is another object to provide such a tool as above in which the incising action is effected by screw means, providing a steady, heavy pressure whereby the rubber is cut away from around the head of the dome nut, and in which the dome nut itself is driven from the metal ring by means of a drift forming part of the tool and adapted to be struck by a hammer.

It is another object to provide in a tool as above described a removable, cylindrical cutter which may be fabricated in different sizes for use in removing different sizes of dome nuts.

In accomplishing these and other objects of the present invention, I have provided improved details of structure, the preferred form of which is illustrated in the accompanying drawings, wherein.

Figure 1:
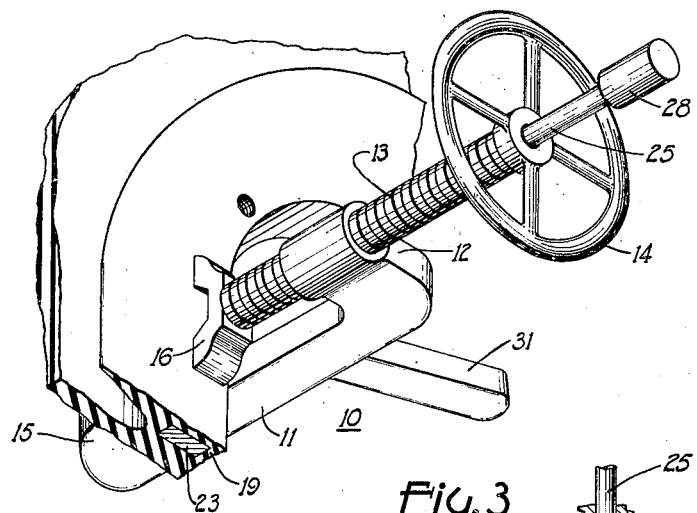
Fig. 1 is a perspective view of the tool of this invention applied to the rubber ring upon which it operates.
Figure 3:
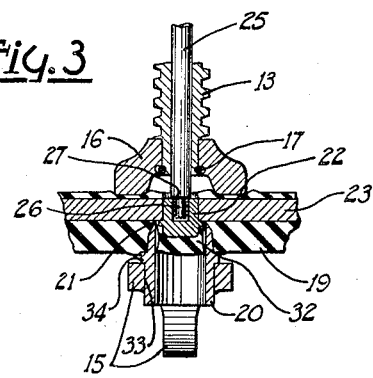
Fig. 3 is a fragmentary cross-sectional view of the device taken at right angles to the view illustrated in Fig. 2, with the cutter at the completion of its cutting stroke.

Referring now in more detail to the drawings:

In Fig. 1 the tool of this invention is shown applied to a rubber covered ring adapted to be mounted in a self-sealing gas tank. The tool 10 comprises a C-shaped holder 11, in one extremity 12 of which is threadedly mounted a plunger 13, which may be reciprocated by means of hand wheel 14 toward and away from the other extremity 15 of holder 11. On the end of plunger 13 is mounted a bridge shaped foot member 16. Foot member 16 is rotatably mounted on plunger 13, being held thereon by a snap ring 17 (Fig. 3). It will be evident that rotation of hand wheel 14, which is fixedly mounted on plunger 13 by means of a set screw 18, advances plunger 13 toward extremity 15 of holder 11. This action causes foot member 16 to press against one side of a rubber ring 19, over the edge of which holder 11 has been placed.

On extremity 15 of holder 11 is removably mounted a circular cylindrical cutter 20 (Fig. 2) having its generatrix parallel to the axis of plunger 13. Cutter 20 has a circular blade 21 adapted to incise rubber ring 19 around a dome nut 22 embedded therein. Dome nut 22 is splined at 24 into a metal ring 23 embedded in rubber ring 19.

From the description thus far, it will be seen that by screwing down plunger 13, foot member 16 is caused to press ring 19 against cutter 20 thereby incising the rubber 19 down to the position shown in Fig. 3 where blade 21 is stopped by metal ring 23.

The rubber having been incised around the head of dome nut 22, the nut is driven from its splined mounting in ring 23 by the action of a drift 25 slidably mounted in a central bore in plunger 13. Drift 25 has a guide finger 26 on the end thereof adapted to fit into the threaded hole in dome nut 22. The actual forcing of nut 22 from ring 23 is effected through a shoulder 27 on drift 25 immediately adjacent guide finger 26. The other end of drift 25 is formed as a head 28 adapted to receive hammer blows for forcing shoulder 27 against nut 22 to drive the nut completely from the ring assembly. Complete removal of drift 25 from plunger 13 is prevented by the action of a collar 29 integrally formed on drift 25 which reciprocates in a counterbore 30 internally formed in plunger 13. In this manner reciprocation of drift 25 within plunger 13 is made possible while still preventing the drift from dropping out of the plunger.

A handle 31 is integrally formed with holder 11 to aid in restraining it from rotation as hand wheel 14 is turned.

Operation

Figure 2:
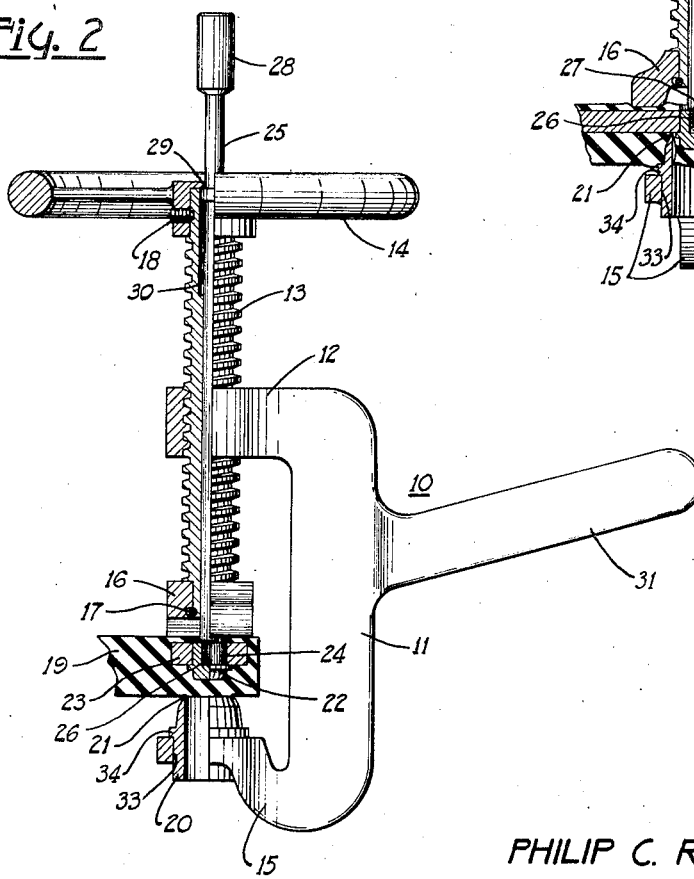
Fig. 2 is a side elevational view partially in section of the tool of Fig. 1.

Holder 11 is placed over the edge of ring 19 opposite dome nut 22 to be removed. Drift 25 is lowered so that finger 26 engages the tapped hole of dome nut 22, thereby centering the apparatus over the dome nut. Hand wheel 14 is rotated until plunger 13 has been lowered just sufficient to engage foot member 16 with the top of ring 19 causing cutter 20 to bear against the bottom of ring 19 as shown in Fig. 2.

Further rotation of hand wheel 14 effectuates the cutting operation in which cutter 20 is pressed into the rubber portion 19 until blade 21 engages metal ring 23 as shown in Fig. 3.

Dome nut 22 is then driven from ring 23 by striking head 28 of drift 25 with a hammer. This forces nut 22 and the cut-away rubber plug 32 through the interior of cylindrical cutter 20.

A new dome nut may then be inserted through the hole thus made and backed up by a small plug of rubber to replace rubber plug 32. Upon vulcanizing of the new plug to rubber ring 19 the repair has been completed.

A variety of different sized cylindrical cutters 20 may be provided having various internal diameters to accommodate various sizes of dome nuts 22. The outside diameter is uniform for all cutters so that universal mounting in hole 33 in holder 11 may be accomplished through the action of a shoulder 34 formed on each cutter 20.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A tool for removing fasteners embedded near the edge of a flat member of rubber or the like, comprising: a C-shaped holder adapted to fit over said edge, a plunger threadedly mounted in said holder near one extremity thereof, a hand wheel on said plunger by means of which said plunger may be rotated and thereby screwed toward the other extremity of said holder, a foot member rotatably mounted on one end of said plunger adapted to engage one side of said flat member adjacent said fastener, a cylindrical cutter mounted on said other extremity with the axis thereof on the line of movement of said plunger and having a circular blade adapted to incise the rubber or the like on the other side of said flat member around said fastener, and a drift movable within said plunger along said line of movement having one end adapted to bear against said fastener, the other end extending from said plunger and adapted to be struck by a hammer to force said fastener from said flat member.

2. A tool for removing fasteners embedded near the edge of a flat member of rubber or the like, comprising: a C-shaped holder adapted to fit over said edge, an outer plunger mounted in said holder movable toward the other extremity thereof, a foot member on one end of said outer plunger adapted to engage one side of said flat member adjacent said fastener, a cylindrical cutter mounted on said other extremity with the generatrix thereof parallel to the line of movement of said outer plunger and having a blade adapted to incise the rubber or the like on the other side of said flat member around said fastener, and an inner plunger movable within said outer plunger along said line of movement having one end adapted to bear against said fastener to force it from said flat member.

PHILIP C. ROVENTINI.

REFERENCES CITED

The following references are of record in the file of this patent:

FOREIGN PATENTS

| Number | Country | Date |
|---|---|---|
| 198,523 | Great Britain | June 7, 1923 |